US012769856B2

(12) United States Patent
Zhang et al.

(10) Patent No.: US 12,769,856 B2
(45) Date of Patent: Oct. 20, 2026

(54) WEB APPLICATION EXECUTION WITH LIMITED DATA ACCESS AND EXTENDED DISPLAY

(71) Applicant: Palantir Technologies Inc., Denver, CO (US)

(72) Inventors: Andy Zhang, New York, NY (US); Paul Ryan, New York, NY (US); Michal Duczynski, London (GB); Matthew Skrobola, New York, NY (US); Gianna Gerton, New York, NY (US); Ilana Radinsky, Atlanta, GA (US); Elliot Hirsch, Philadelphia, PA (US); Evan Johnson, Wyckoff, NJ (US); Xinyi Fu, New York, NY (US); Simon Kaufmann, New York, NY (US); Ka-Wing Courtney Tam, New York, NY (US); Ruo Yun Chen, New York, NY (US)

(73) Assignee: Palantir Technologies Inc., Aventura, FL (US)

( * ) Notice: Subject to any disclaimer, the term of this patent is extended or adjusted under 35 U.S.C. 154(b) by 39 days.

(21) Appl. No.: 19/063,182

(22) Filed: Feb. 25, 2025

(65) Prior Publication Data

US 2026/0170158 A1 Jun. 18, 2026

Related U.S. Application Data

(60) Provisional application No. 63/735,853, filed on Dec. 18, 2024.

(51) Int. Cl.

| | |
|---|---|
| ***G06F 21/62*** | (2013.01) |
| ***G06F 16/36*** | (2019.01) |
| ***G06F 16/957*** | (2019.01) |

(52) U.S. Cl.
CPC ............ *G06F 21/62* (2013.01); *G06F 16/367* (2019.01); *G06F 16/9577* (2019.01)

(58) Field of Classification Search
CPC ..... G06F 21/62; G06F 16/367; G06F 16/9577
See application file for complete search history.

(56) References Cited

U.S. PATENT DOCUMENTS

| | | | | | |
|---|---|---|---|---|---|
| 5,664,150 | A * | 9/1997 | Isaac | G06F 12/0804 711/143 |
| 5,752,262 | A * | 5/1998 | Cassetti | G06F 12/0811 711/143 |

(Continued)

OTHER PUBLICATIONS

"Use case development", Palantir, Retrieved Oct. 14, 2024, https://www.palantir.com/docs/foundry/app-building/overview, 5 pages.

(Continued)

*Primary Examiner* — Aravind K Moorthy

(57) ABSTRACT

A system and related methods for running an application in an extended browser session with a limited scope of access is disclosed. The system is programmed to determine the scope of access to an ontology for an application generating a graphical output as a webpage in a kiosk mode, where the ontology has object types and link types instantiated from underlying datasets. The scope of access depends on the user account running the application and excludes operations leading to writebacks to the underlying datasets. The system is programmed to continuously supply a limited-scope token with a future expiration date that represents currently determined scope of access, which is to be used as a cookie for the application. For each Web request that includes such a cookie for access to the ontology, the system is programmed to allow access according to the scope of access represented by the cookie.

20 Claims, 6 Drawing Sheets

(56) References Cited

U.S. PATENT DOCUMENTS 6,008,807 A * 12/1999 Bretschneider ..... G06F 3/04855 715/974
6,401,172 B1 * 6/2002 Prudvi ................ G06F 12/0855 711/143
6,880,155 B2 * 4/2005 Schwabe ............. G06F 9/45504 717/162
8,397,056 B1 * 3/2013 Malks ..................... H04L 63/10 726/28
8,407,576 B1 * 3/2013 Yin ....................... G06F 3/0481 715/837
8,458,596 B1 * 6/2013 Malks .................... G06Q 10/06 715/742
8,800,009 B1 * 8/2014 Beda, III ............ H04L 63/0846 713/157
8,839,360 B1 * 9/2014 Orr ......................... G06F 21/33 726/4
9,372,684 B1 * 6/2016 Dufresne ............ G06F 11/3604
9,514,207 B1 * 12/2016 Breedvelt-Schouten .................... G06F 16/24578
10,025,574 B1 * 7/2018 Sargent ..................... G06F 8/61
10,120,354 B1 * 11/2018 Rolston ............... H04L 12/2816
10,366,079 B1 * 7/2019 Xiao ................... G06F 16/2423
10,468,126 B1 * 11/2019 Harding ................ G06F 16/367
10,715,860 B1 * 7/2020 Bartlett .............. H04N 21/4312
11,128,653 B1 * 9/2021 Tkachuk ............... G06F 16/335
11,145,407 B1 * 10/2021 Jesneck .............. G06Q 10/0639
11,171,964 B1 * 11/2021 Huang ................... G06F 21/33
11,200,037 B1 * 12/2021 Mann .................... G06F 16/367
11,204,878 B1 * 12/2021 Pusdesris ............ G06F 12/0804
11,461,408 B1 * 10/2022 Bhushan ............. G06F 16/9038
11,508,464 B1 * 11/2022 Fishkind ................ G16H 10/20
11,546,324 B1 * 1/2023 Brooker .................. H04L 63/20
11,556,579 B1 * 1/2023 Bhatia ................. G06F 16/3334
11,580,164 B1 * 2/2023 Falco .................... G06F 16/338
11,599,862 B1 * 3/2023 Hecht .................. G06Q 20/102
11,803,695 B1 * 10/2023 Li ......................... H04L 67/142
12,015,630 B1 * 6/2024 Cross .................... H04L 43/045
12,034,872 B1 * 7/2024 Sharma ................. H04L 9/0861
12,086,115 B1 * 9/2024 Shaji ................... G06F 11/0784
12,341,816 B1 * 6/2025 Cross .................. H04L 43/0811
12,341,894 B1 * 6/2025 Frymire ................ H04L 9/3213
12,519,800 B1 * 1/2026 Janakiraman ......... H04L 63/105
12,626,158 B1 * 5/2026 Wilk ........................ G06N 5/04
12,639,460 B2 * 5/2026 Kozlowski .......... G06F 21/6218
12,640,998 B2 * 5/2026 Goyal ................. H04L 41/5009
2006/0248442 A1 * 11/2006 Rosenstein ............. G06F 16/93 715/255
2008/0307523 A1 * 12/2008 Subramanyam ........ G06F 16/36 726/21
2008/0320232 A1 * 12/2008 Vishin ................... G06F 12/128 711/143
2009/0177777 A1 * 7/2009 Behrendt .............. G06F 16/367 709/226
2010/0030552 A1 * 2/2010 Chen ..................... G06F 16/367 704/9
2010/0057646 A1 * 3/2010 Martin ................... G16H 15/00 706/11
2010/0070517 A1 * 3/2010 Ghosh ................... G06F 16/367 707/758
2010/0185700 A1 * 7/2010 Bodain ................... H04L 67/02 707/E17.044
2010/0217784 A1 * 8/2010 Carter ................... G06F 16/367 715/205
2011/0154498 A1 * 6/2011 Fissel .................. H04L 63/1433 715/764
2011/0214064 A1 * 9/2011 Schneider ........... G06F 16/2386 715/744
2011/0246527 A1 * 10/2011 Bitting .................. G06F 21/604 707/E17.001
2012/0144501 A1 * 6/2012 Vangpat ................ H04L 63/108 726/28
2012/0239884 A1 * 9/2012 Ishizawa ............... G06F 12/126 711/E12.029
2012/0317486 A1 * 12/2012 Loew .................. G06F 16/9577 715/730
2013/0055074 A1 * 2/2013 Trese ...................... G06F 16/93 715/255
2013/0061169 A1 * 3/2013 Pearcy .................. G06F 11/328 715/788
2013/0073460 A1 * 3/2013 Paquin ................ G06F 21/6263 705/44
2014/0026193 A1 * 1/2014 Saxman .............. H04L 63/0853 726/4
2014/0059660 A1 * 2/2014 Marra ................... G06F 21/335 726/5
2014/0189775 A1 * 7/2014 Burch ................... G06F 21/606 726/1
2014/0282207 A1 * 9/2014 Wouhaybi ............. G06F 3/0481 715/779
2014/0337611 A1 * 11/2014 Kuscher .................. G06F 21/57 348/14.07
2015/0142828 A1 * 5/2015 Nguyen ................ G06F 16/367 707/758
2015/0143418 A1 * 5/2015 Kim ................. H04N 21/42204 725/37
2015/0178386 A1 * 6/2015 Oberkampf ........... G06F 16/367 707/749
2016/0021164 A1 * 1/2016 Chakarapani ......... G06F 16/783 709/224
2016/0048850 A1 * 2/2016 Wooten ................. H04L 67/535 705/7.29
2016/0094560 A1 * 3/2016 Stuntebeck ........... G06F 3/0481 726/1
2016/0103592 A1 * 4/2016 Prophete ............. G06F 3/04845 715/771
2016/0171618 A1 * 6/2016 Besman ................. G06Q 40/08 705/4
2016/0210334 A1 * 7/2016 Prophete ............. G06F 16/9566
2016/0216865 A1 * 7/2016 Kuscher .................. G06F 9/451
2016/0342685 A1 * 11/2016 Basu ..................... G06F 16/367
2016/0370973 A1 * 12/2016 Morgan .............. G06F 16/2455
2016/0378736 A1 * 12/2016 Byron ................... G06F 3/0484 715/234
2017/0023377 A1 * 1/2017 Burtner .............. G08B 13/2462
2017/0034172 A1 * 2/2017 Biggs ...................... H04L 63/08
2017/0076471 A1 * 3/2017 Prophete ................. G06F 21/53
2017/0134381 A1 * 5/2017 Abdelhamed ........... H04L 63/10
2017/0212765 A1 * 7/2017 Marmignon .......... G06F 9/5077
2017/0255655 A1 * 9/2017 Seal ...................... G06F 16/211
2017/0339250 A1 * 11/2017 Momchilov ............ H04L 67/34
2018/0018393 A1 * 1/2018 Latapie ............... G06F 16/3344
2018/0026984 A1 * 1/2018 Maker ................... H04L 63/102 726/4
2018/0060368 A1 * 3/2018 McCauley, Jr. ..... G06F 16/9558
2018/0121917 A1 * 5/2018 Purves ............... G06Q 20/3674
2018/0173386 A1 * 6/2018 Adika ..................... G06F 8/427
2018/0262573 A1 * 9/2018 Przybylski ............... F24F 11/52
2018/0302391 A1 * 10/2018 Jones .................... G06F 16/284
2018/0366021 A1 * 12/2018 Zertuche .................. G09B 7/00
2019/0005498 A1 * 1/2019 Roca .................. G06Q 20/3825
2019/0095992 A1 * 3/2019 Soh ......................... G07F 19/20
2019/0102071 A1 * 4/2019 Redkina .................. G06F 11/14
2019/0122209 A1 * 4/2019 Shah .................... G06Q 20/405
2019/0158569 A1 * 5/2019 Singleton, IV ....... G06F 3/0483
2019/0163818 A1 * 5/2019 Mittal ................. G06F 16/3344
2019/0188319 A1 * 6/2019 Anerousis ........... G06F 16/2264
2019/0227824 A1 * 7/2019 Kuchoor ................. G06F 16/26
2020/0007644 A1 * 1/2020 Carlson ................... H04L 67/06
2020/0074002 A1 * 3/2020 Kalia .................. G06F 16/3326
2020/0134058 A1 * 4/2020 Liu ..................... G06F 16/2379
2020/0151226 A1 * 5/2020 Blumenfeld .......... G06F 16/909
2020/0177743 A1 * 6/2020 Ando ................. H04N 1/00198
2020/0202020 A1 * 6/2020 Ewing ................... G06F 21/629
2020/0296110 A1 * 9/2020 Kobel ..................... G06F 16/26
2020/0301939 A1 * 9/2020 Hollander ........... G06F 16/2471
2020/0410000 A1 * 12/2020 Chen ..................... G06F 16/901
2021/0005289 A1 * 1/2021 Graham ................. G16H 10/20
2021/0034652 A1 * 2/2021 Masood ................. G06N 5/022
2021/0042105 A1 * 2/2021 Jones ...................... G06F 9/445
2021/0064645 A1 * 3/2021 Ferreira ................ G06F 16/258

(56) References Cited

U.S. PATENT DOCUMENTS

2021/0089997 A1* 3/2021 Klibanov ....... G06Q 10/063114
2021/0209144 A1* 7/2021 Trim ..................... G06F 16/367
2021/0224751 A1* 7/2021 Nagalingam ......... G06F 40/131
2021/0232953 A1* 7/2021 Hartley ................. G06F 16/313
2021/0306473 A1* 9/2021 Inouye ............... H04N 1/00307
2021/0314171 A1* 10/2021 Choyi ................... H04L 9/3247
2022/0027561 A1* 1/2022 Ganesan ................ G06N 3/045
2022/0092187 A1* 3/2022 Tonry ...................... G06F 21/33
2022/0101151 A1* 3/2022 Portisch ................ G06F 16/212
2022/0147547 A1* 5/2022 Kwatra ................. G06F 16/337
2022/0230718 A1* 7/2022 Bastide ................... G06F 16/23
2022/0232003 A1* 7/2022 Smolny ............... H04L 63/0807
2022/0239699 A1* 7/2022 Rothschild ............ H04L 67/148
2022/0327492 A1* 10/2022 Vontobel ............... G06F 16/367
2022/0345328 A1* 10/2022 O'Dierno ........... G05B 13/0265
2022/0374532 A1* 11/2022 Zaharia ................. G06F 3/0673
2022/0383335 A1* 12/2022 Horst ..................... G06Q 10/04
2022/0398271 A1* 12/2022 Wu ..................... G06F 16/3329
2022/0414136 A1* 12/2022 Jones .................. G06F 16/2445
2022/0414481 A1* 12/2022 Hossayni .............. G06F 16/316
2023/0026368 A1* 1/2023 Silverstein .............. H04L 65/75
2023/0030086 A1* 2/2023 Martinez Ayala .... G06F 16/322
2023/0033904 A1* 2/2023 Tokarev Sela ...... G06F 16/2455
2023/0038988 A1* 2/2023 Freund ................ G06F 16/9577
2023/0115771 A1* 4/2023 Patt ........................ G06Q 40/08 705/4
2023/0118171 A1* 4/2023 Agarwal ................. G06F 16/35 704/9
2023/0120160 A1* 4/2023 Oh ...................... H04L 63/0815 726/5
2023/0143422 A1* 5/2023 Park .................... G06F 11/1629 712/1
2023/0169360 A1* 6/2023 Busany ................. G06F 16/212 706/46
2023/0206559 A1* 6/2023 Brennan ............. G06F 12/0808 345/418
2023/0222044 A1* 7/2023 Arveti ................. G06F 11/3055 717/168
2023/0237248 A1* 7/2023 Lea ....................... G06F 40/143 715/234
2023/0237269 A1* 7/2023 Guzik ................... G06F 16/367 704/9
2023/0300135 A1* 9/2023 Krishnan ................ G06F 9/541 726/4
2023/0305957 A1* 9/2023 Fetterman ........... G06F 12/0891
2023/0319049 A1* 10/2023 Cotterell ............... G06F 21/335 726/9
2023/0359676 A1* 11/2023 Agassi .................. G06F 16/367
2023/0362136 A1* 11/2023 Cheng ................... H04L 9/0838
2024/0004915 A1* 1/2024 Nir ........................ G06F 16/367
2024/0005094 A1* 1/2024 Nir ........................ G06F 16/313
2024/0022343 A1* 1/2024 Graham ............... G01C 21/206
2024/0037132 A1* 2/2024 Yannuzzi .............. G06F 16/367
2024/0048592 A1* 2/2024 Viswanathan ........ H04L 63/105
2024/0087687 A1* 3/2024 Marcjan ................ G06F 16/367
2024/0112409 A1* 4/2024 Cross ....................... G06F 3/011
2024/0129313 A1* 4/2024 Ankrom ................ G06F 21/602
2024/0144559 A1* 5/2024 Deschamps Rascon .................... G06F 16/248
2024/0163276 A1* 5/2024 Chinta .................. G06F 21/335
2024/0195626 A1* 6/2024 Hale ..................... F17C 13/001
2024/0267582 A1* 8/2024 Park ................. H04N 21/43076
2024/0289712 A1* 8/2024 Krishnaiah ...... G06Q 10/06315
2024/0296181 A1* 9/2024 Busany ................. G06F 16/367
2024/0320715 A1* 9/2024 Swanson ................ G06Q 10/40
2024/0320718 A1* 9/2024 Hecht .................. G06Q 20/367
2024/0330508 A1* 10/2024 Ankrom .............. G06F 21/6245
2024/0354326 A1* 10/2024 Baker ................. G06F 16/2336
2024/0362153 A1* 10/2024 Sriramdas ........... G06F 11/3684
2025/0053587 A1* 2/2025 Coulter ............... G06F 16/2462
2025/0077275 A1* 3/2025 Elbow ............ G06Q 10/063114
2025/0085837 A1* 3/2025 Alhajyousef ....... G06F 3/04845
2025/0111002 A1* 4/2025 Johnson .............. G06F 16/9554
2025/0131015 A1* 4/2025 Newman ............... G06F 16/285
2025/0139211 A1* 5/2025 Venkatesan ............. G06F 21/31
2025/0147885 A1* 5/2025 Kim .................... G06F 12/0804
2025/0147986 A1* 5/2025 Surve .................... G06F 16/287
2025/0165518 A1* 5/2025 Baughman ............ G06F 16/367
2025/0199823 A1* 6/2025 Yan ..................... G06F 9/44526
2025/0227088 A1* 7/2025 Goodman ............... G06F 21/33
2025/0245240 A1* 7/2025 Bojbarah ................ G06F 16/26
2025/0307454 A1* 10/2025 Estoesta ................. G06Q 40/02
2025/0315507 A1* 10/2025 Bjontegard ........... G06F 16/367
2025/0323842 A1* 10/2025 Goyal ...................... H04L 41/22
2025/0328533 A1* 10/2025 Baker ................... G06F 16/289
2025/0328541 A1* 10/2025 Baker ..................... G06F 16/25
2025/0348471 A1* 11/2025 Cirillo ................... G06F 16/367
2025/0355634 A1* 11/2025 Duggal ...................... G06F 8/34
2025/0383634 A1* 12/2025 Daraiseh ............ G05B 13/0265
2026/0039599 A1* 2/2026 Malin ................... H04L 47/196
2026/0064935 A1* 3/2026 Rasane ................. G06F 40/106
2026/0099614 A1* 4/2026 Vijay .................... G06F 21/604
2026/0119019 A1* 4/2026 Fiske .................. G06F 3/04845
2026/0119517 A1* 4/2026 Liu .......................... G06F 16/25
2026/0119689 A1* 4/2026 Quach ................. G06F 21/6218

OTHER PUBLICATIONS

"Workshop", Palantir, Retrieved Oct. 14, 2024, https://www.palantir.com/docs/foundry/workshop/overview, 2 pages.
"Securing an operational application", Palantir, Retrieved Oct. 14, 2024, https://www.palantir.com/docs/foundry/security/securing-a-business-application, 10 pages.

* cited by examiner

WEB APPLICATION EXECUTION WITH LIMITED DATA ACCESS AND EXTENDED DISPLAY

RELATED APPLICATIONS

This application claims the benefit under 35 U.S.C. § 119(e) of U.S. Provisional Application No. 63/735,853, titled "WEB APPLICATION EXECUTION WITH LIMITED DATA ACCESS AND EXTENDED DISPLAY" and filed on Dec. 18, 2024, the entire contents of which are hereby incorporated by reference as if fully set forth herein.

TECHNICAL FIELD

The present disclosure relates to managing execution of web applications, and more particularly to enforcing access control over a web application for an extended period.

BACKGROUND

Some web applications are designed to show live data to a specific group of individuals. For example, a monitor screen may be available on a floor of a hospital to show updates on patient status, room changes, and other relevant data on that floor to the hospital staff. For such a use, the goal would be for the graphical user interface (GUI) of the web application to be publicly accessible for an indefinite period of time, without being timed out, which clearly makes access control over the web application a high-priority concern. It would be helpful to allow such extended display while continuously enforcing rigorous access control over the web application.

SUMMARY

The appended claims may serve as a summary of the invention.

BRIEF DESCRIPTION OF THE DRAWINGS

Example embodiments will now be described by way of non-limiting examples with reference to the accompanying drawings, in which.

DETAILED DESCRIPTION OF CERTAIN EMBODIMENTS

Figure 1:
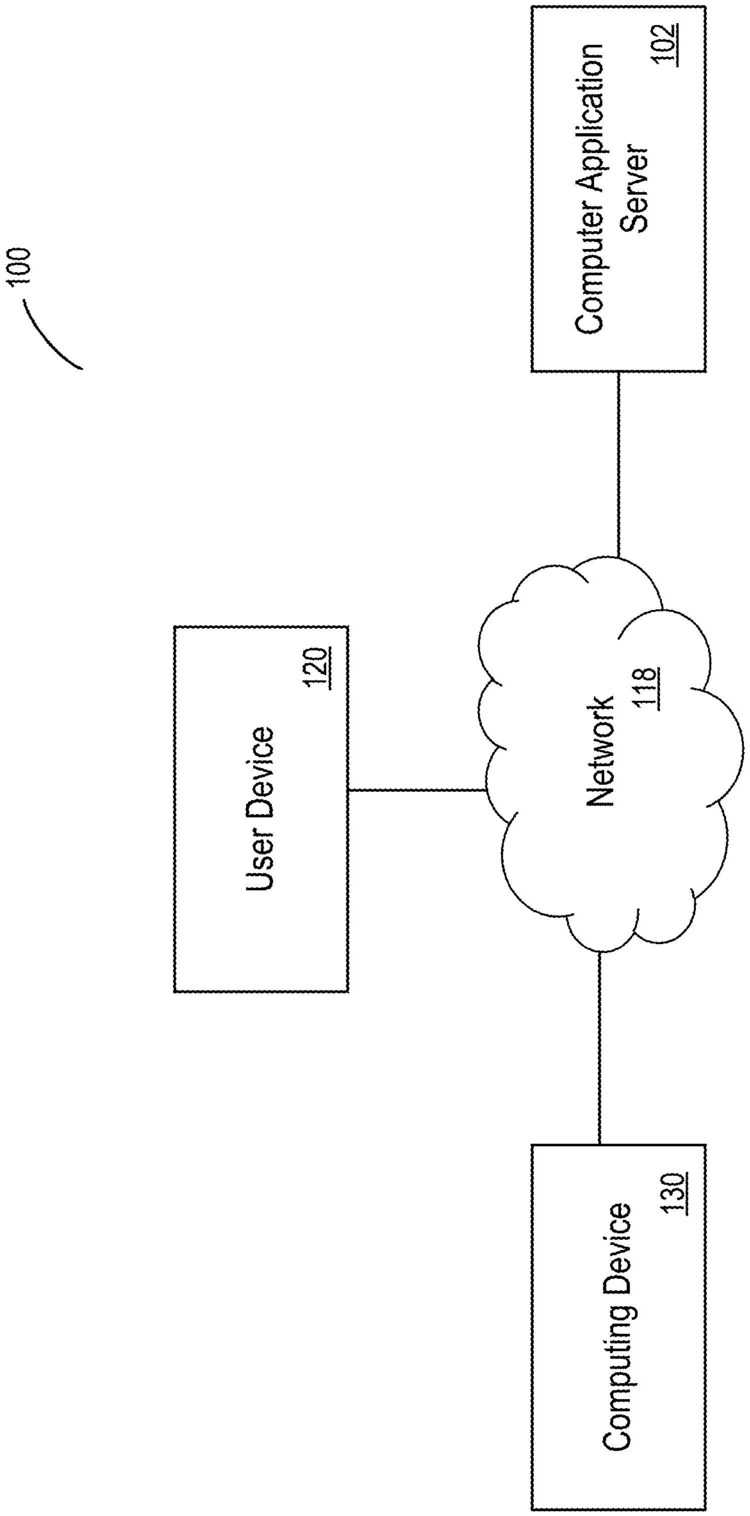
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system and related methods for running an application in an extended browser session with a limited scope of access is disclosed. The system is programmed to determine the scope of access to an ontology for an application generating a graphical output as a webpage in a kiosk mode, where the ontology has object types and link types instantiated from underlying datasets. The scope of access depends on the user account running the application and excludes operations leading to writebacks to the underlying datasets. The system is programmed to continuously supply a limited-scope token with a future expiration date that represents currently determined scope of access, which is to be used as a cookie for the application. For each Web request that includes such a cookie for access to the ontology, the system is programmed to allow access according to the scope of access represented by the cookie.

In some embodiments, an application is developed using no or little code, including allowing the use of graphical elements to enable launching the application in a kiosk mode. In the kiosk mode, the application is run in a browser, continuously presenting live data from an ontology until an instruction to terminate the kiosk mode is received. For example, the application can show updates on patient status, room changes, and other relevant data on a hospital floor to the hospital staff on that hospital floor. The ontology has object types and link types, which are instantiated to generate objects and links that connect objects from underlying datasets. For example, there can be object types representing patients and hospital rooms, and there can be link types representing that a patient is in a hospital room. The ontology also has action types for actions to manipulate objects or links, such as creating a new object for a new patient, and functions to perform computations on objects or links, such as assessing a patient's health condition based on vital statistics. The ontology also includes various types of access permissions that link user accounts to the ontology-related data.

In some embodiments, the system is programmed to receive a request from a computing device for a user account to execute the application in the kiosk mode. The system is programmed to then identify a list of ontology-related items covered in the application. For example, the application can cover patient object types and associated action types and functions. The system is programmed to next determine a list of access permissions to access the ontology based on the list of ontology-related items and the user account, excluding any access permissions that lead to writebacks to the underlying datasets. For example, the user account can be in an editor role for the patent object type, which is associated with view and edit access, and thus the application is permitted to view the patient object type only. The system is programmed to then generate a limited-scope token representing the list of access permissions and having a future expiration time and transmit the limited-scope token to the computing device.

In some embodiments, the computing device is programmed to then run the application with the limited-scope token as a cookie in a browser under the user account. The computing device can be programmed to transmit a Web request via the application for accessing the ontology to the system from time to time. The Web request would include the cookie and could identify the application, the user account, and one or more ontology-related items to be retrieved, such as the full set of patient objects where the location property has the value of a particular hospital floor.

In some embodiments, the system can be programmed to verify that the Web request is from the right application run by the right user account. The system can be programmed to further verify that the one or more ontology-related items are within the scope permitted by the cookie. The system can be programmed to then permit access to the one or more ontology-related items. In response to such a Web request or to a specific request to renew the limited-scope token, the system can be programmed to determine that the current time is within a particular range (e.g., 5 minutes) from the expiration time in the limited-scope token. The system can be programmed to then determine the current list of access permissions to access the ontology based on the list of ontology-related items and the user account, again excluding any access permissions that lead to writebacks to the underlying datasets, which are often associated with the action types in the ontology. The system can be programmed to then return a limited-scope token representing the current list of access permissions and having a new, future expiration time to the computing device. In this way, the computing device can be programmed to execute the application without encountering time-outs or other interruptions.

In some embodiments, the system is programmed to receive an instruction to terminate the kiosk mode for the application. For example, this can occur every night when the user of the user account is no longer or never employed on the hospital floor. The system can be programmed to refuse to generate another limited-scope token with a future expiration date as a cookie for the application, or immediately transmit an instruction to the computing device to shut down the application.

The system disclosed herein has several technical benefits. By automatically issuing renewed limited-scope tokens, the system allows the application to run without interruption, eliminating any computational overhead of, in response to each session time-out from inactivity and thus failure to renew a session cookie, repeatedly processing a new login before issuing a new session cookie. Each limited-scope token also ensures proper access to the ontology, specifically without writebacks, thus enforcing heightened security for implementing the kiosk mode with an extended, often public GUI.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, a networked computer system 100 comprises a computer application server ("server") 102, a user device 120, and a computing device 130, which are communicatively coupled through direct physical connections or via a network 118.

In some embodiments, the user device 120 is programmed or configured to execute a builder application for building a Web application that accesses an ontology. Specifically, the user device 120 is programmed to present the GUI of the builder application for building the Web application with no or little code, including generating a graphical setting that enables the Web application to be run in the kiosk mode. The user device 120 can also be configured to save the Web application locally or transmit the Web application to a central repository for storage. The user device 120 node can comprise a personal computing device that has an integrated output device or is coupled to an output device, such as a desktop computer, laptop computer, or tablet computer.

In some embodiments, the computing device 130 is programmed or configured to execute a Web application that accesses the ontology, which can be retrieved from a local storage or the central repository. Specifically, the computing device 130 is programmed to present the GUI of the Web application for a potentially indefinite period of time, while the GUI continuously shows live ontology data. The computing device 130 can comprise similar computing facility as the server 102, as further discussed below. The computing device 130 can also comprise a personal computing device, such as a desktop computer, laptop computer, or tablet computer.

In some embodiments, the server 102 is programmed or configured to manage the ontology and the repository. The management of the ontology includes building and maintaining the ontology and implementing access control and other operations related to the ontology. The access control is implemented against all the applications that access the ontology, including a Web application. The server 102 can also act as a Web server, including generating cookies for the Web applications as Web clients, which could be used to enforce the access control over the Web applications. The server 102 can comprise any centralized or distributed computing facility with sufficient computing power in data processing, data storage, and network communication for performing the above-mentioned functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the server 102 is programmed to transmit the builder application to the user device 120. The server 102 can be programmed to subsequently receive a Web application developed to access the ontology using the builder application from the user device 120 and stores the Web application in the repository. The server 102 can also be programmed to then retrieve the Web application from the repository and transmit the Web application to the computing device 130, which is programmed to execute the Web application in a browser. The server 102 can be programmed to then generate and transmit updated cookies to the computing device 130 from time to time based on verified permissions associated with the Web application to access the ontology to enable continuous presentation of the GUI of the Web application.

3. Functional Descriptions

In some embodiments, the server 102 is programed to establish a mapping between a group of datasets and an ontology. The ontology includes definitions for all relevant object types, such as people, computers, networks, documents, or events, with objects being instantiated from the object types based on values of the datasets. The ontology can also include definitions for all relevant link types, such as similarities or dependencies, with links being instantiated from the link types also based on values of the datasets.

Specific structures, such as properties or versions, and specific operations, such as revision, access control, or provenance tracking at the object, link, or property level (or corresponding row or column level) apply to all object types and all link types. The object types and link types are considered as "ontology entity types". The objects and the links are considered as "ontology entities", which encompass the properties. The ontology also includes definitions of actions, which allow changes to ontology entities and are grouped into action types. In addition, the ontology includes definitions of functions, which support computation over values of ontology entities. The ontology entity types together with action types and functions are considered as "ontology resources". The ontology resources, associated ontology entities, and corresponding datasets are considered as "ontology-related items".

In some embodiments, the server 102 is programmed to manage access control of the ontology at different levels. Different sets of permissions can be respectively associated with different ontology resource types. Each set of permissions can include creating, reading, modifying, deleting, loading, executing, or managing, for example. Certain sets of permissions can be captured into different user roles. For example, an editor role can be associated with editing permissions, while a discoverer role can be associated with seeing resource names and metadata only. One set of permissions can depend on one or more other sets of permissions. Separate sets of permissions can also be maintained between ontology resources and underlying datasets, with permissions associated with datasets governing permissions associated with ontology entities.

In some embodiments, the server 102 is programmed to manage access control specific to an application type. For example, an application type can have organization requirements for user accounts to belong to a particular organization or marking requirements for ontology resources or ontology entities to be accessed to have specific labels, in order for a user account to access such an ontology resource or ontology entity.

3.1. Configuring Kiosk Mode

In some embodiments, the computing device 130 is programmed to execute a builder application having a builder GUI for building, with little or no coding, a computer application ("application") having its own application GUI. The builder GUI allows specifying graphical aspects of the application, such as layouts, widgets, or events, and functional aspects of the application, such as variables (indicating how data moves), actions, or functions within the ontology, using graphical operations, such as selecting, dragging, or dropping graphical elements of the builder GUI. The builder GUI can also allow embedding other applications into the current application. For example, the builder GUI can include a specific type of widget for embedding another application.

Figure 2:
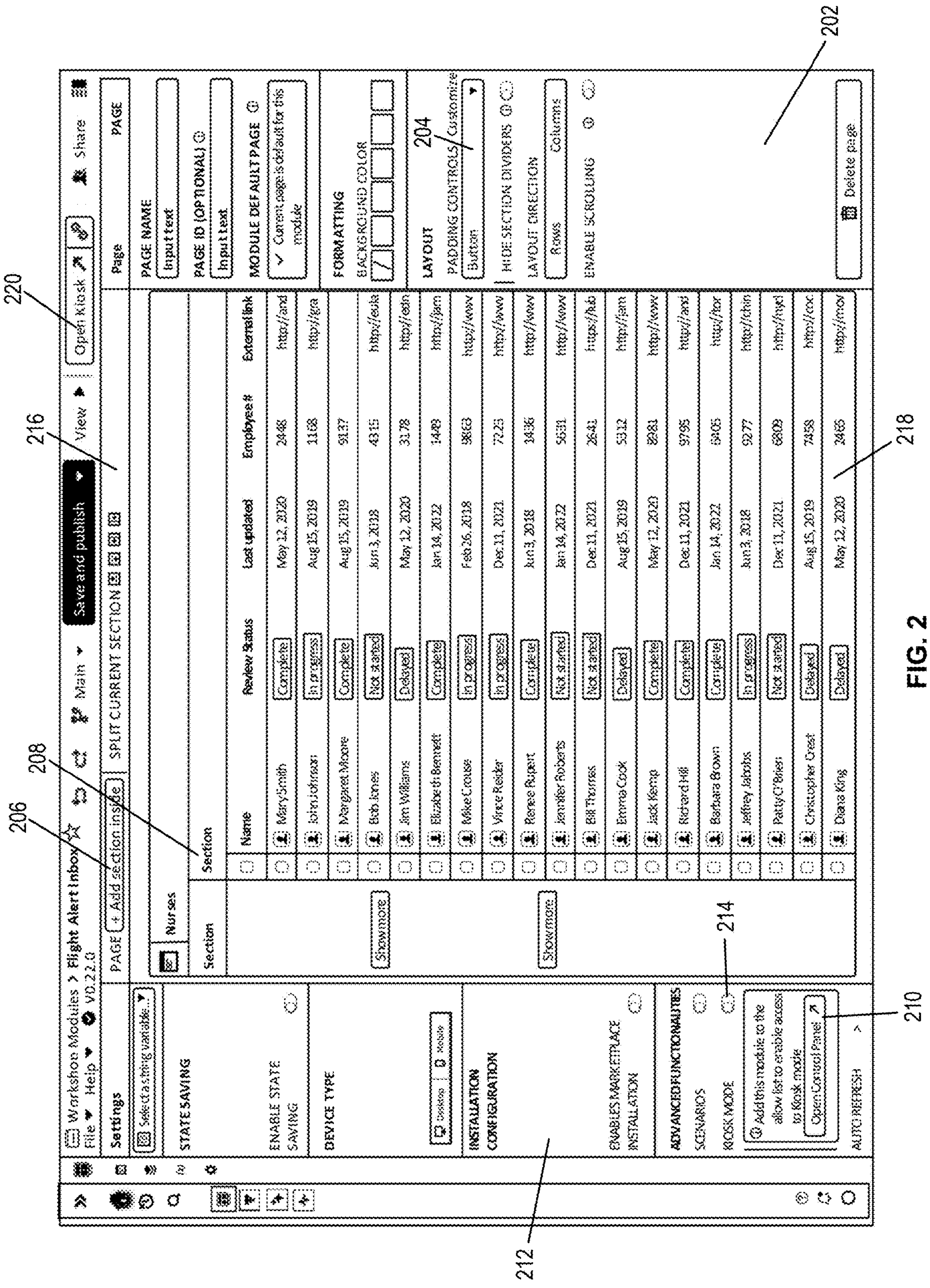
FIG. 2 illustrates an example builder GUI for building an application to be run in the kiosk mode.

FIG. 2 illustrates an example builder GUI for building an application to be run in the kiosk mode. The center portion 218 of the builder GUI shows the application GUI being built. The top portion 216 of the builder GUI contains graphical elements for managing the layout of the application GUI, such as the button 206 for adding a section to the application GUI, such as the section 208. The right portion 202 of the builder GUI includes graphical elements for managing the content of the application GUI, such as the drop-down menu 204 for selecting the type of a widget to add to a section. The left portion 212 of the builder GUI contains graphical elements for managing metadata of the application GUI, such as the button 210 for enabling the kiosk mode and the switch 214 for turning on a kiosk mode for the application. The kiosk mode allows the application GUI to be active within a browser for as long as possible without timing out as a corresponding session expires, as is further discussed later. Enabling the kiosk mode involves adding the application to a central list of applications allowed to run in the kiosk mode. Turning on the kiosk mode involves adding a graphical element to the builder GUI, such as the button 220, for running the application and in the kiosk mode. In certain embodiments, such a graphical element can be added to the application GUI for switching the application during execution to the kiosk mode.

Figure 3:
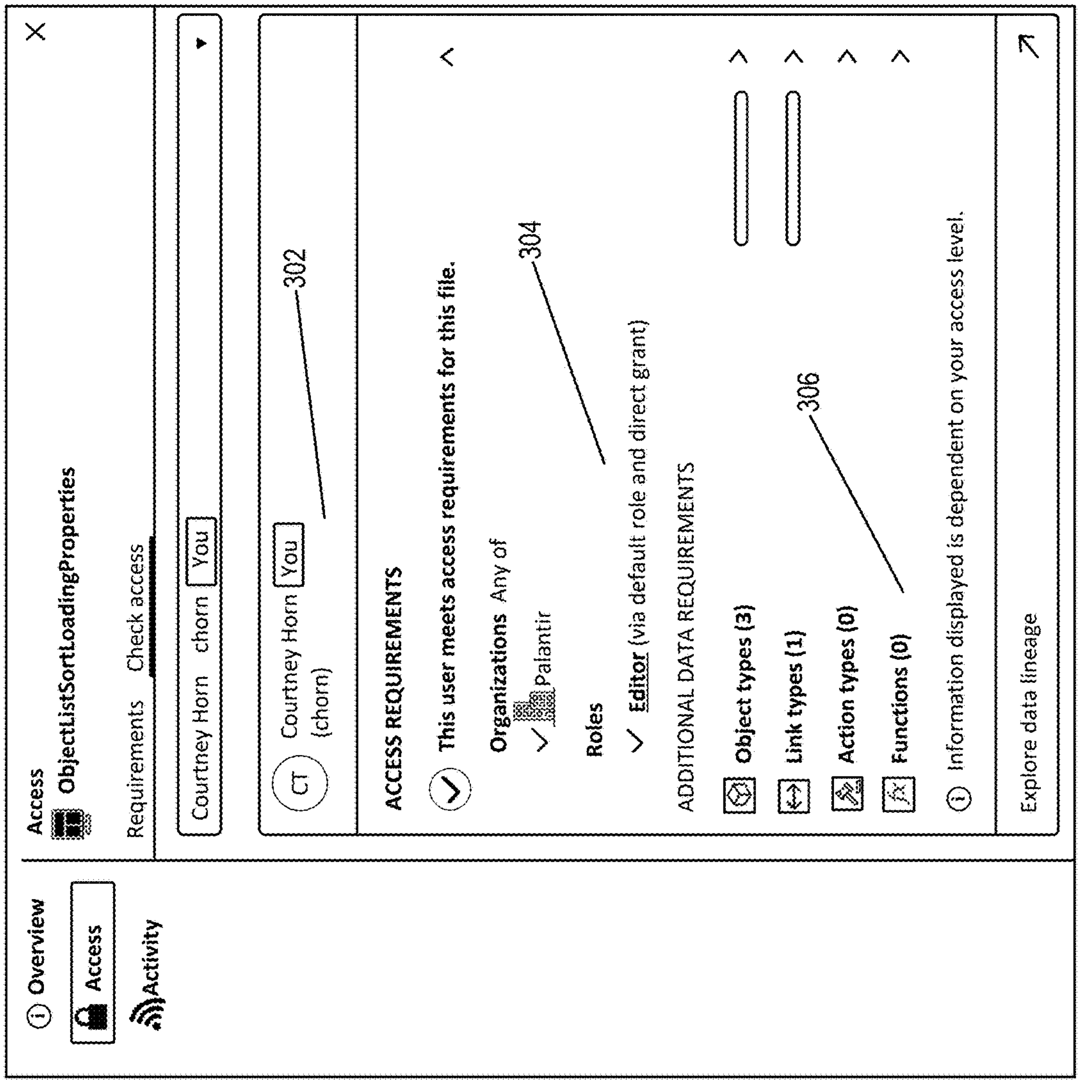
FIG. 3 illustrates an example scoping GUI for an application to be run in the kiosk mode.

In some embodiments, the computing device 130 can be programmed to present a scoping GUI for adjusting or reviewing the scope of access for the application in the kiosk mode with respect to a user account expected to launch the application in the kiosk mode. FIG. 3 illustrates an example scoping GUI for an application to be run in the kiosk mode. The scoping GUI includes a first section 302 that identifies a select user account expected to launch the application into the kiosk mode. The scoping GUI includes a second section 304 that indicates whether the select user account satisfies organization requirements and is in an appropriate user role for running the application in the kiosk mode. The scoping GUI also includes a third section 306 that shows information related to various ontology resource types covered by the application and associated with access permissions granted to the select user account. The scoping GUI can be part of the builder GUI and can be linked from the screen illustrated in FIG. 2, for example. The scoping GUI can allow drilling down into each ontology resource type to further adjust or review information related to access permissions. The scoping GUI can also be automatically presented right before running the application.

3.2. Launching Kiosk Mode

In some embodiments, the computing device 130 is programmed to receive a user request associated with a user account to launch the application in the kiosk mode. For example, the request can be received via a user interaction with the button 220 in FIG. 2. The computing device 130 is programmed to then submit a system request to launch the application in the kiosk mode to the server 102. The system request can include an application identifier identifying the application and a user account identifier identifying the user account.

In some embodiments, the server 102 can be programmed to first verify that the application is on the allowlist of applications permitted to run in the kiosk mode, as noted above. The server 102 can be programmed to also verify that the user account belongs to a permission group of user accounts permitted to run the application in the kiosk mode, as further discussed below. The server 102 is programmed to next determine the scope of access for the application based on the system request. The server 102 can be programmed to first determine whether the application has embedded applications (or modules), by detecting specific types of widgets for embedding an application or other known means. The server 102 can be programmed to then identify, for the application and each embedded application, the list of any ontology resources covered in the application, including object types, link types, or action types, and any corresponding ontology entities and underlying datasets.

In some embodiments, the server 102 can be programmed to then determine an initial list of access permissions granted to the user account for accessing the list of ontology-related items. The initial list of access permissions can also be for accessing one or more components of the embedded applications, such as a dashboard, a document, or a corresponding analysis, which do not directly correspond to ontology entities but can access the ontology. Furthermore, the server 102 is programmed to determine an updated list of access permissions by disabling writebacks to any dataset associated with the ontology from the initial list of access permissions. The access permission leading to writebacks can be associated with action types for actions to manipulate objects or links. These access permissions can also be associated with ontology entity types that can be updated or application components that can update ontology entities. The server 102 can be programmed to next generate a limited-scope token that includes an expiration time and information identifying the updated list of access permissions, and transmit the limited-scope token to the computing device 130. The server 102 can also be programmed to then store a record associating the application with the user account and the updated list of access permissions. With such a record, the limited-scope token can include information identifying the record instead of the updated list of access permissions. The record or the token serves to indicate that when the application is launched into the kiosk mode by the user account, the application can interact with the ontology related items based on the updated list of access permissions. In certain embodiments, the server 102 can also be programmed to verify that the initial list or updated list of access permissions allows access to the full list of ontology-related items covered in the application. The server 102 can be further programmed to generate and transmit an error message instead of a limited-scope token in response to a negative verification result.

In some embodiments, the computing device 130 is programmed to launch the application in the kiosk mode in a browser with the limited-scope token as a cookie. The application GUI can be presented in a webpage or as a modal window above an existing webpage. Before the launch, the computing device 130 can be programmed to automatically present the scoping GUI as a reminder or confirmation of the scope of access for the application in the kiosk mode with respect to the user account associated with the user request. The computing device 130 can also be configured to verify whether the cookie allows access to the full list of ontology-related items covered in the application. When it is determined that the cookie does not allow such access, the computing device 130 can be programmed to perform partial execution based on the restricted access or perform no execution at all.

In some embodiments, the computing device 130 can be programmed to subsequently send Web requests via the application for accessing the ontology to the server, to continuously present live data via the application GUI, for example. The Web requests can be sent according to a schedule or in response to user interactions with the application GUI. Each Web request can request access to a list of ontology-related items. Each Web request can also include the cookie. In addition, each Web request can include the application identifier and the user account identifier to further inform the server 102 of how ontology-related items should be accessed in response to the Web request.

In some embodiments, in response to a Web request to access any portion of ontology-related items, the server 102 can be programmed to determine whether the cookie has expired. When it is determined that the cookie has not expired, the server 102 can be programmed to first determine whether the Web request uses the right cookie. Specifically, the server 102 can be configured to determine whether the application identifier and the user identifier in the Web request match the information in the cookie or can be derived from the cookie, to prevent another user account or another application running in the browser from utilizing the same cookie. When it is determined that the Web request uses the right cookie, the server 102 can be programmed to determine whether the Web request seeks the right access based on the list of access permissions in the cookie or can be derived from the cookie. When it is determined that the Web request seeks the right access, the server 102 can be programed to allow the requested access, such as by transmitting the portion of ontology-related items to the computing device 130. When it is determined that the Web request does not use the right cookie or seek the right access, the server 102 is configured to reject the Web request. When it is determined that the cookie has expired, the server 102 can be programmed to determine a current list of access permissions granted to the user account for accessing the requested portion of ontology-related items, which might be different from the list of access permissions in the cookie or in a corresponding record. The server 102 can be programmed to then similarly determine a revised list of permissions by disabling writebacks to any dataset associated with the ontology from the current list of access permission, generate a new limited-scope token that includes a new expiration time and information identifying the revised list of access permissions, and transmit the new limited-scope token to the computing device 130. In certain embodiments, the server 102 can be programmed to determine the current list of access permission and ultimately generate a new limited-scope token in response to every Web request, not just only upon determining that the cookie has expired.

In some embodiments, the computing device 130 is programmed to continue running the application in the kiosk mode in the browser with the new limited-scope token as a cookie. As discussed above, the computing device 130 can be programmed to send Web requests via the application for access to ontology-related items to the server, where each Web request can include the cookie. In this manner, the application can run in the kiosk mode without interruption until the kiosk mode is explicitly terminated.

3.3. Terminating and Otherwise Managing Kiosk Mode

In some embodiments, the server 102 is programmed to manage kiosk mode operations, including setting related permissions for each application to be run in the kiosk mode or monitoring the status of each application running in the kiosk mode. The management can be performed based on user input.

Figure 4:
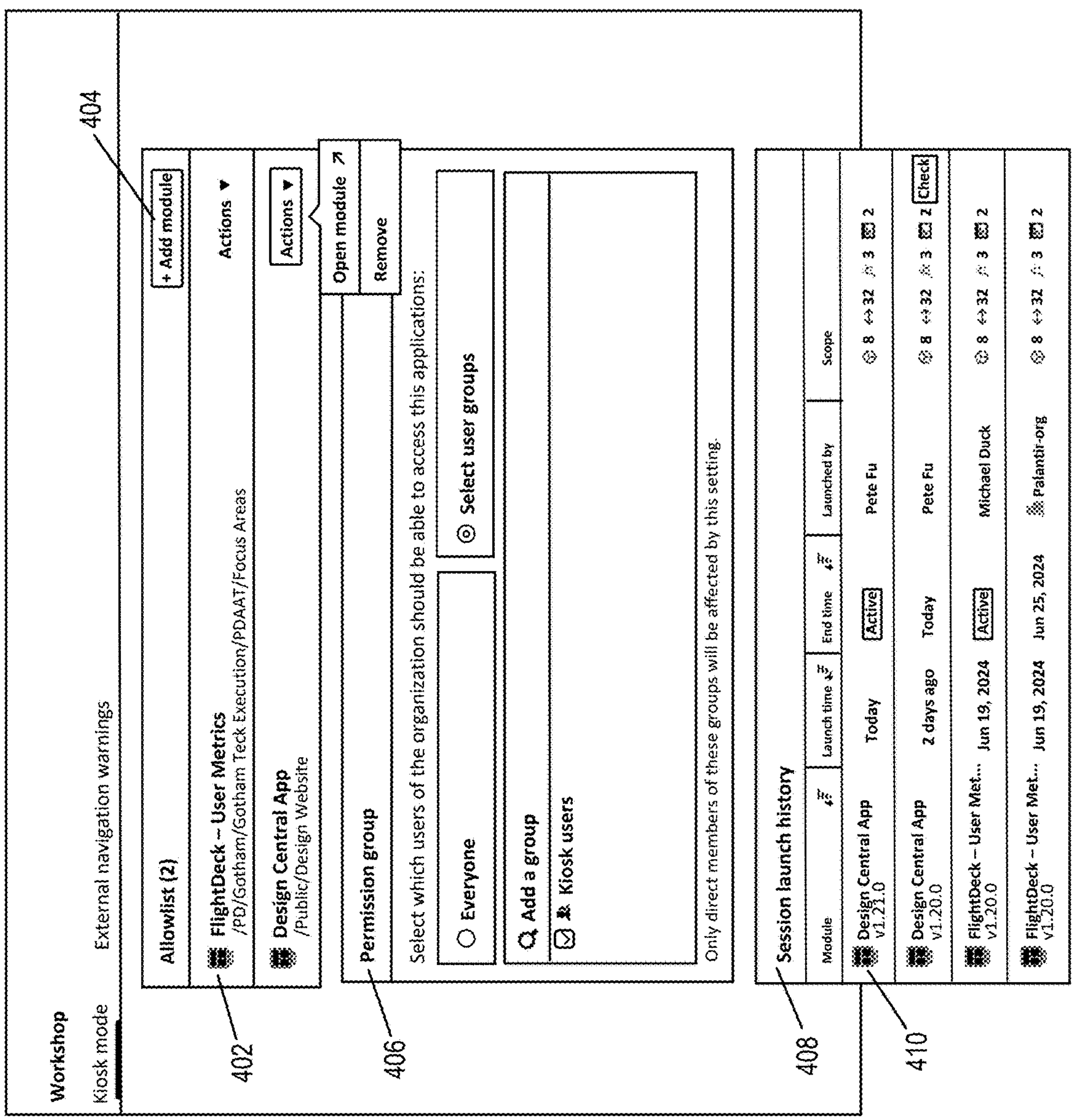
FIG. 4 illustrates an example GUI for managing kiosk mode operations.

FIG. 4 illustrates an example GUI for managing kiosk mode operations. The GUI includes an allowlist section 402, where an application can be added to an allowlist indicating that the application is allowed to run in the kiosk mode. The application can be added via a graphical element, such as the button 404. As discussed above, an application can also be added to the allowlist via a graphical element in the builder GUI, such as the button 210 in FIG. 2 for enabling the kiosk mode. The GUI also includes a permissions group section 406, where a user account can be added to a permission group indicating that the user account is allowed to run a specific application, such as the one highlighted in the allowlist section 402, in the kiosk mode via one or more graphical elements. In addition, the GUI includes a session launch history section 408, which tracks the status of each application running in the kiosk mode and considers each such execution as a session. For example, the session launch history section 408 includes multiple rows, such as the row 410, where each row corresponds to a session and shows the name of the application in the Module column, a time when the application was launched into the kiosk mode in the "Launch time" column, a time when the application was pulled from the kiosk mode in the "End time" column, an identifier of a user account launching the application into the kiosk mode in the "Launched by" column, and the scope of the application in terms ontology resources or other ontology-related items in the Scope column. In certain embodiments, the GUI allows users to revoke a session via graphical elements. For example, each row in the session launch history section 408 can include a button for revoking the corresponding session. The termination can be triggered by a lack of computing resources, a suspicion of unauthorized execution, or other reasons.

4. Example Processes

Figure 5:
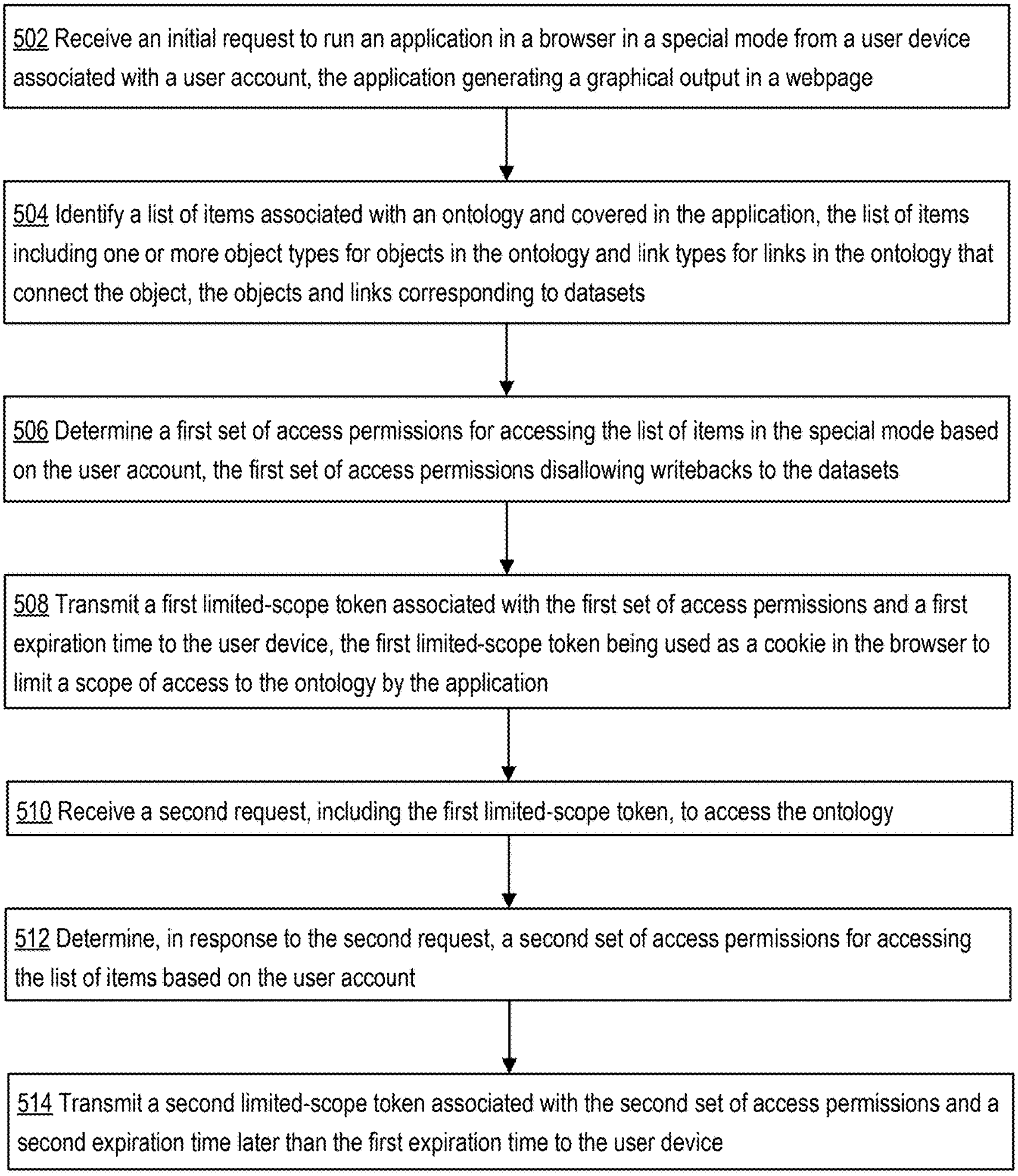
FIG. 5 illustrates a process of running an application in an extended browser session with a limited scope of access in accordance with disclosed embodiments.

FIG. 5 illustrates a process of running an application in an extended browser session with a limited scope of access in accordance with disclosed embodiments. FIG. 5 is shown in simplified, schematic format for purposes of illustrating a clear example and other embodiments may include more, fewer, or different elements connected in various manners. FIG. 5 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 502, the server 102 is programmed to receive an initial request to run an application in a browser in a special mode from a user device associated with a user account, the application generating a graphical output in a webpage. In some embodiments, the special mode is a kiosk mode where the application continuously generates graphical outputs in the webpage based on live data in the ontology without interruption until an instruction to terminate the special mode is received.

In step 504, the server 102 is programmed to identify a list of items associated with an ontology and covered in the application. The list of items includes one or more object types for objects in the ontology and link types for links in the ontology that connect the objects, where the objects and links correspond to datasets.

In some embodiments, the identifying comprises detecting a set of modules embedded in the application, and finding one or more items covered in each of the set of modules. In certain embodiments, the list of items further includes one or more action types for actions to create, modify, link, or delete the objects or links in the ontology, and functions to perform computations based on the objects or links in the ontology. In other embodiments, the ontology has distinct groups of access permission types for the object types, the link types, the action types, the functions, and the datasets, and the first set of access permissions and the second set of access permissions are associated with the distinct groups of access permission types.

In step 506, the server 102 is programmed to determine a first set of access permissions for accessing the list of items in the special mode based on the user account, the first set of access permissions disallowing writebacks to the datasets.

In some embodiments, determining the first set of access permissions comprises verifying that the application is on a predetermined allowlist of applications permitted to be run in the special mode or that the user account is part of a predetermined permissions group of user accounts permitted to run the application. In certain embodiments, the server 102 is programmed to transmit an identifier of the first set of access permissions to the user device in response to the initial request, and receive a certain request for a limited-scope token using the identifier.

In step 508, the server 102 is programmed to transmit a first limited-scope token associated with the first set of access permissions and a first expiration time to the user device. The first limited-scope token is used as a cookie in the browser to limit a scope of access to the ontology by the application.

In some embodiments, transmitting the first limited-scope token is performed in response to the certain request. In other embodiments, the server 102 is programmed to store an association among a first identifier of the first set of access permissions, a second identifier of the application, and a third identifier of the user account. In other embodiments, the server 102 is programmed to receive a certain request, including the first limited-scope token, to gain a specific type of access to a specific item in the ontology. The server 102 is programmed to then determine that the specific type of access to the specific item is outside a scope permitted by the first limited-scope token. In addition, the server 102 is programmed to reject the certain request.

In step 510, the server 102 is programmed to receive a second request, including the first limited-scope token, to access the ontology. In some embodiments, the second request is a Web request submitted by a specific application as a Web client, and determining the second set of access permissions comprises verifying that the specific application matches the application based on the association.

In step 512, the server 102 is programmed to determine, in response to the second request, a second set of access permissions for accessing the list of items based on the user account.

In some embodiments, determining the second set of access permissions comprises confirming that a time of receiving the second request is within a predetermined range from the first expiration time. In certain embodiments, the second set of access permissions disallows writebacks to the datasets.

In step 514, the server 102 is programmed to transmit a second limited-scope token associated with the second set of access permissions and a second expiration time later than the first expiration time to the user device.

In some embodiments, the server 102 is programmed to receive a third request, including the second limited-scope token, to access the ontology. The server 102 is programmed to then determine, in response to the third request, a third set of access permissions for accessing the list of items based on the user account. In addition, the server 102 is programmed to determine that the third set of access permissions does not allow access to at least one of the list of items. The server 102 is programmed to next transmit an error message to the user device.

A system for enabling an extended browser session with a limited scope of access, comprising:

receiving an initial request to run an application in a browser in a special mode from user account via a graphical user interface, the application generating a graphical output as a webpage;

sending the initial request to a server managing an ontology;

receiving an identifier of a set of access permissions associated with the ontology accessed by the application from the server in response to the initial request, the set of access permissions excluding write permissions;

transmitting a subsequent request for a limited-scope token using the identifier;

receiving a first limited-scope token with a first expiration date from the server in response to the subsequent request;

running the application in the browser in the special mode using the limited-scope token as a cookie to limit a scope of access to the ontology by the application in the special mode, wherein the method is performed by one or more processors.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
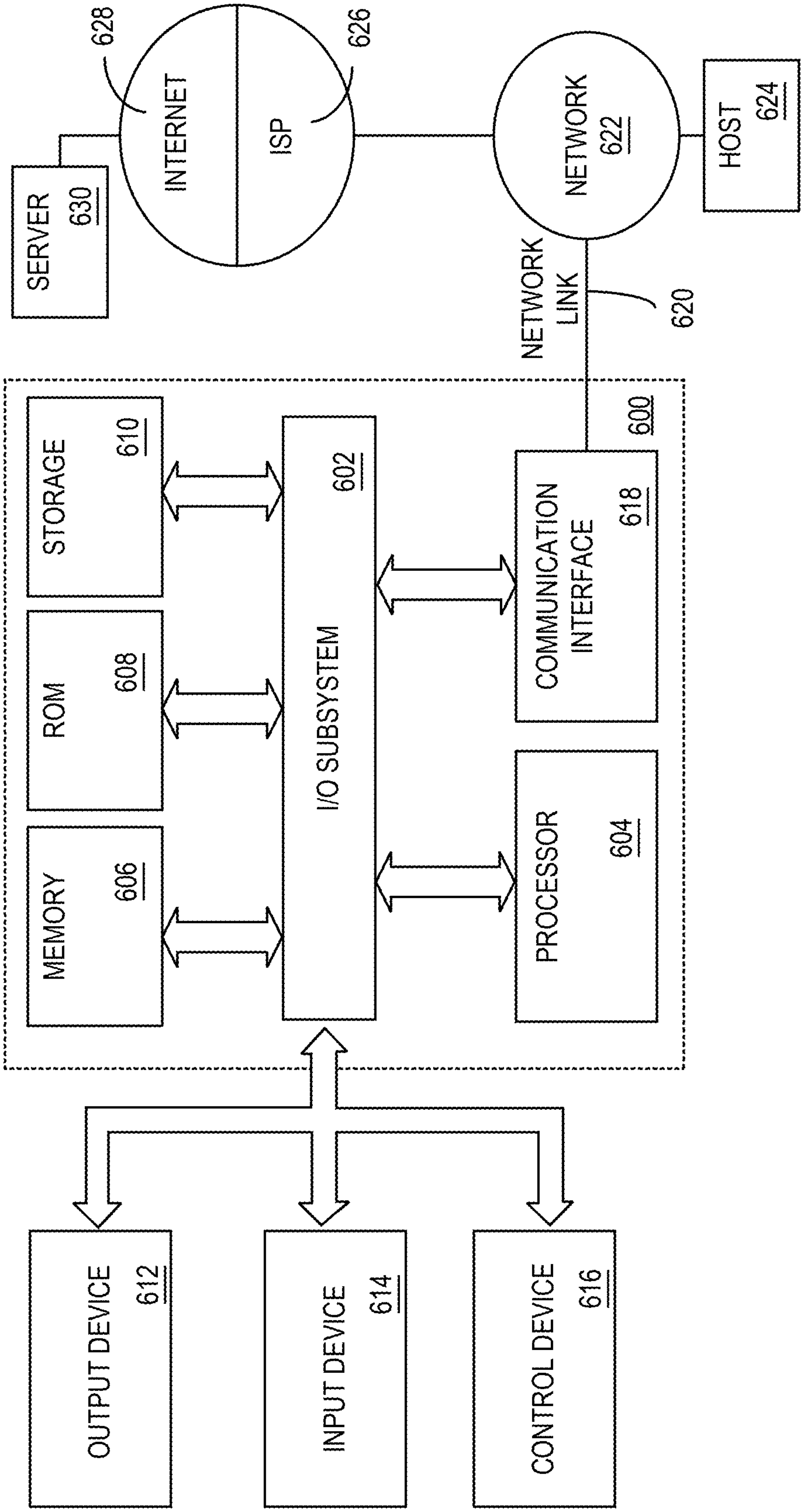
FIG. 6 illustrates an example computer system upon which various embodiments may be implemented.

FIG. 6 illustrates an example computer system upon which various embodiments may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or Advanced RISC Machines (ARM) processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as flash memory, or solid-state storage, magnetic disk, or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, XML, Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on the output device 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a LAN, WAN, campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, Uniform Resource Locator (URL) strings with parameters in HTTP payloads, application programming interface (API) calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using SQL or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of running an application in an extended browser session with a limited scope of access, comprising:

receiving an initial request to run an application in a browser in a special mode from a user device associated with a user account, the application generating a graphical output in a webpage;

identifying a list of items associated with an ontology and covered in the application, the list of items including one or more object types for objects in the ontology and link types for links in the ontology that connect the objects, the objects and links corresponding to datasets;

determining a first set of access permissions for accessing the list of items in the special mode based on the user account, the first set of access permissions disallowing writebacks to the datasets;

transmitting a first limited-scope token associated with the first set of access permissions and a first expiration time to the user device, the first limited-scope token being used as a cookie in the browser to limit a scope of access to the ontology by the application;

receiving a second request, including the first limited-scope token, to access the ontology;

determining, in response to the second request, a second set of access permissions for accessing the list of items based on the user account;

transmitting a second limited-scope token associated with the second set of access permissions and a second expiration time later than the first expiration time to the user device, wherein the method is performed by one or more processors.

2. The method of claim 1, further comprising:

receiving a third request, including the second limited-scope token, to access the ontology;

determining, in response to the third request, a third set of access permissions for accessing the list of items based on the user account;

determining that the third set of access permissions does not allow access to at least one of the list of items;

transmitting an error message to the user device.

3. The method of claim 1, further comprising:

transmitting an identifier of the first set of access permissions to the user device in response to the initial request;

receiving a certain request for a limited-scope token using the identifier, the transmitting the first limited-scope token being performed in response to the certain request.

4. The method of claim 1, the identifying comprising:

detecting a set of modules embedded in the application;

finding one or more items covered in each of the set of modules.

5. The method of claim 1, the list of items further including one or more action types for actions to create, modify, link, or delete the objects or links in the ontology, functions to perform computations based on the objects or links in the ontology, and components of applications that access the ontology.

6. The method of claim 5, the ontology having distinct groups of access permission types for the object types, the link types, the action types, the functions, and the datasets, the first set of access permissions and the second set of access permissions being associated with the distinct groups of access permission types.

7. The method of claim 1, determining the first set of access permissions comprising verifying that the application is on a predetermined allowlist of applications permitted to be run in the special mode or that the user account is part of a predetermined permissions group of user accounts permitted to run the application.

8. The method of claim 1, further comprising storing an association among a first identifier of the first set of access permissions, a second identifier of the application, and a third identifier of the user account.

9. The method of claim 8, the second request being a Web request submitted by a specific application as a Web client, determining the second set of access permissions comprising verifying that the specific application matches the application based on the association.

10. The method of claim 1, the special mode being a kiosk mode where the application continuously generates graphical outputs in the webpage based on live data in the ontology without interruption until an instruction to terminate the special mode is received.

11. The method of claim 1, determining the second set of access permissions comprising confirming that a time of receiving the second request is within a predetermined range from the first expiration time.

12. The method of claim 1, further comprising:

receiving a certain request, including the first limited-scope token, to gain a specific type of access to a specific item in the ontology;

determining that the specific type of access to the specific item is outside a scope permitted by the first limited-scope token;

rejecting the certain request.

13. The method of claim 1, the second set of access permissions disallowing writebacks to the datasets.

14. A system for running an application in an extended browser session with a limited scope of access, comprising:

a memory;

one or more processors coupled to the memory and configured to perform:

receiving an initial request to run an application in a browser in a special mode from a user device associated with a user account, the application generating a graphical output in a webpage;

identifying a list of items associated with an ontology and covered in the application, the list of items including one or more object types for objects in the ontology and link types for links in the ontology that connect the objects, the objects and links corresponding to datasets;

determining a first set of access permissions for accessing the list of items in the special mode based on the user account, the first set of access permissions disallowing writebacks to the datasets;

transmitting a first limited-scope token associated with the first set of access permissions and a first expiration time to the user device, the first limited-scope token being used as a cookie in the browser to limit a scope of access to the ontology by the application;

receiving a second request, including the first limited-scope token, to access the ontology;

determining, in response to the second request, a second set of access permissions for accessing the list of items based on the user account;

transmitting a second limited-scope token associated with the second set of access permissions and a second expiration time later than the first expiration time to the user device.

15. The system of claim 14, the list of items further including one or more action types for actions to create, modify, link, or delete the objects or links in the ontology, and functions for functions to perform computations based on the objects or links in the ontology.

16. The system of claim 15, the ontology having distinct groups of access permission types for the object types, the link types, the action types, the functions, and the datasets, the first set of access permissions and the second set of access permissions being associated with the distinct groups of access permission types.

17. The system of claim 14, the one or more processors configured to further perform storing an association among a first identifier of the first set of access permissions, a second identifier of the application, and a third identifier of the user account.

18. The system of claim 17, the second request being a Web request submitted by a specific application as a Web client, determining the second set of access permissions comprising verifying that the specific application matches the application based on the association.

19. The system of claim 14, the one or more processors configured to further perform:

receiving a certain request, including the first limited-scope token, to gain a specific type of access to a specific item in the ontology;

determining that the specific type of access to the specific item is outside a scope permitted by the first limited-scope token;

rejecting the certain request.

20. One or more non-transitory storage media storing instructions which when executed cause one or more processors to perform:

receiving an initial request to run an application in a browser in a special mode from a user device associated with a user account, the application generating a graphical output in a webpage;

identifying a list of items associated with an ontology and covered in the application, the list of items including one or more object types for objects in the ontology and link types for links in the ontology that connect the objects, the objects and links corresponding to datasets;

determining a first set of access permissions for accessing the list of items in the special mode based on the user account, the first set of access permissions disallowing writebacks to the datasets;

transmitting a first limited-scope token associated with the first set of access permissions and a first expiration time to the user device, the first limited-scope token being used as a cookie in the browser to limit a scope of access to the ontology by the application;

receiving a second request, including the first limited-scope token, to access the ontology;

determining, in response to the second request, a second set of access permissions for accessing the list of items based on the user account;

transmitting a second limited-scope token associated with the second set of access permissions and a second expiration time later than the first expiration time to the user device.

* * * * *